United States Patent
Gill et al.

(10) Patent No.: US 12,293,361 B2
(45) Date of Patent: May 6, 2025

(54) SYSTEM AND METHOD FOR PROCESSING A TRANSACTION USING ACCOUNT INFORMATION ON FILE

(71) Applicant: Mastercard International Incorporated, Purchase, NY (US)

(72) Inventors: Lisa-Marie Gill, Tannersville, PA (US); Jonathan Collin, Rayleigh (GB); Claire Le Gal, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 290 days.

(21) Appl. No.: 17/574,758

(22) Filed: Jan. 13, 2022

(65) Prior Publication Data
US 2022/0138716 A1  May 5, 2022

Related U.S. Application Data

(63) Continuation of application No. 16/671,526, filed on Nov. 1, 2019, now Pat. No. 11,232,424, which is a continuation of application No. 15/229,705, filed on Aug. 5, 2016, now Pat. No. 10,504,095.

(51) Int. Cl.
*G06Q 20/40* (2012.01)
*G06Q 20/20* (2012.01)
*G06Q 20/34* (2012.01)
*G06Q 20/36* (2012.01)

(52) U.S. Cl.
CPC .......... *G06Q 20/401* (2013.01); *G06Q 20/20* (2013.01); *G06Q 20/206* (2013.01); *G06Q 20/34* (2013.01); *G06Q 20/36* (2013.01); *G06Q 20/40* (2013.01)

(58) Field of Classification Search
CPC .... G06Q 20/401; G06Q 20/20; G06Q 20/206; G06Q 20/34; G06Q 20/36; G06Q 20/40
See application file for complete search history.

(56) References Cited

U.S. PATENT DOCUMENTS

| 8,632,000 B2 | 1/2014 | Laracey |
| 9,978,062 B2 | 5/2018 | Raj et al. |
| 2011/0295743 A1* | 12/2011 | Patterson ............... G06Q 40/02 705/40 |
| 2013/0024371 A1 | 1/2013 | Hariramani et al. |

(Continued)

OTHER PUBLICATIONS

Stretch, "TCP Flags: PSH and URG", Mar. 2011, available at https://packetlife.net/blog/2011/mar/2/tcp-flags-psh-and-urg/ (Year: 2011).*

(Continued)

*Primary Examiner* — Allen C Chein
(74) *Attorney, Agent, or Firm* — Buckley, Maschoff & Talwalkar LLC (57) ABSTRACT

Provided are a system and method for identifying a transaction as a card on file payment transaction. The method may include receiving an authorization request message for a transaction from a merchant computing device, detecting payment account information and an identifier which are included in the authorization request message, where the identifier identifies the payment account information as being from a payment account on file, and authorizing the transaction based on the detected payment account information and the detected identifier.

17 Claims, 6 Drawing Sheets

(56) References Cited

U.S. PATENT DOCUMENTS

| | | |
|---|---|---|
| 2014/0114857 A1 | 4/2014 | Griggs et al. |
| 2014/0164254 A1 | 6/2014 | Dimmick |
| 2014/0304055 A1 | 10/2014 | Faith |
| 2015/0032627 A1 | 1/2015 | Dill et al. |
| 2015/0127547 A1* | 5/2015 | Powell ................. G06Q 20/382 |
| | | 705/67 |
| 2016/0171458 A1 | 6/2016 | Singh |
| 2018/0197171 A1* | 7/2018 | Steinman ............. G06Q 20/385 |

OTHER PUBLICATIONS

"A Guide to Safe and Secure Card-on-File Transactions", Nov. 2021, https://www.chargebackgurus.com/blog/card-on-file (Year: 2021).*

892 Form dated Oct. 15, 2018 which was issued in a counterpart U.S. Appl. No. 15/229,705.

892 Form dated Apr. 14, 2019 which was issued in a counterpart U.S. Appl. No. 15/229,705.

Notice of Allowance dated Apr. 14, 2019 which was issued in a counterpart U.S. Appl. No. 15/229,705.

892 Form dated Oct. 1, 2021 which was issued in a counterpart U.S. Appl. No. 16/671,526.

Notice of Allowance dated Oct. 1, 2021 which was issued in a counterpart U.S. Appl. No. 16/671,526.

\* cited by examiner

SYSTEM AND METHOD FOR PROCESSING A TRANSACTION USING ACCOUNT INFORMATION ON FILE

CROSS-REFERENCE TO RELATED APPLICATION(S)

The present application is a is a continuation of U.S. patent application Ser. No. 16/671,526, filed on Nov. 1, 2019, in the United States Patent and Trademark Office, which claims the benefit of U.S. patent application Ser. No. 15/229,705, filed on Aug. 5, 2016, in the United States Patent Trademark Office, the entire disclosures of each of which are hereby incorporated herein by reference for all purposes.

FIELD

Exemplary embodiments described herein relate generally to electronic transactions for payment of goods and/or services and, more particularly, to electronic transactions in which payment is made using a card on file.

BACKGROUND

An increasing amount of merchants and non-merchant payment services offer consumers the ability to store payment account information for later use (referred to as 'card on file') making purchasing items and paying bills much easier. By storing payment account information with the merchant or a third party non-merchant processor it is not necessary for the consumer to enter their payment account information each time they submit a payment. In some cases, storing a card on file allows consumers the ability to make payments with a simple click of a button. However, in a card on file transaction, the card is not present which creates a greater chance of fraud.

In an effort to reduce fraud with card not present transactions, a Card Verification Method (CVM) code may be requested by a merchant. For example, the CVM code may be a CVC2 for MasterCard, CVV2 for Visa, CID for American Express, and the like, and is typically a three or four digit number located on either the front or the back of a payment card. In particular, a merchant may request entry of the CVM code during to verify that the payment account information is being input by someone in the presence of the actual payment card. In most cases, issuers will reject a transaction where the CVM does not match the card number.

The effectiveness of a CVM code is limited to the ability to keep the code away from fraudsters and/or criminals, which is why the Payment Card Industry (PCI) prohibits a CVM code from being stored by a merchant. That is, the merchant is allowed to use the M code during an initial transaction but the merchant cannot store the CVM code for future transactions. Accordingly, a card on file transaction typically does not include the CVM code. As a result, a card on file transaction are at greater risk of being declined by issuers.

Another type of card not present transaction is a recurring payment transaction. A recurring payment (RP) transaction is a transaction made pursuant to an agreement between a cardholder and a merchant whereby the cardholder authorizes the merchant to bill the cardholder's payment card on a periodic basis, such as monthly, quarterly, annually, or as needed without a specified end date. Each payment may be for a variable or a fixed amount. Typically, a recurring payment transaction includes a recurring payment indicator which marks the transaction as a recurring transaction. When a transaction is marked as a recurring transaction, many issuers might still approve the transaction even if a payment account expiration date is invalid or expired.

Recently, however, merchants have begun using the recurring payment indicator incorrectly in an effort to indicate that payment account information for a transaction is already on file. In some cases, even merchants that do not offer payment through a recurring business model have been utilizing the recurring payment indicator. While the incorrect use of the recurring payment indicator may result in higher transaction approval ratings, it may also result in a higher amount of fraud. Also, there are many transactions in which a card on file may be used but which are not subject to payment through recurring payments, for example, purchases for goods and services at non-regular intervals.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings, in which.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The exemplary embodiments described herein relate to a unique identifier that may be added to a transaction message. For example, the identifier may be added to transaction messages requesting payment using card information or the account information that is already on file with a merchant or a non-merchant payment device. The identifier may be a new identifier that is included within an existing authorization request message. Accordingly, the identifier may cause minimal impact on existing payment processing methods.

According to various aspects, the identifier described herein identifies or otherwise indicates that the transaction is a card on file transaction (e.g., payment is being made using an account previously used/stored). For example, the identifier may be a unique identifier that solely or only identifies the transaction as a card on file transaction type. The identifier may be included within an existing field of a financial transaction message such as the International Organization for Standardization (ISO) 8583 message. For example, the identifier may be a new value that is not previously used within the existing field. As another example, the identifier may be appended to an already used value within the existing field. The identifier may include a value such as an alphanumeric value (i.e., binary, numeric, etc.), a special character, a blank, and/or the like.

During an initial transaction between a cardholder and a merchant, the merchant may receive payment account information from the cardholder, for example, through the merchant's web site, through mail order/telephone order, and the like. If encrypted in a PCI-compliant way, the merchant may store the payment account and may use the payment account in subsequent transactions between the cardholder and the merchant. The stored payment account is referred to as a card on file or an account on file. In these examples, the stored payment account information may be the primary account number (PAN) and the payment card's expiration date.

When the cardholder initiates a subsequent purchase with the merchant using the card on file, a merchant point of sale (POS) terminal or non-merchant payment processing device may add an identifier to a financial transaction message and submit the financial transaction message to a payment network for authorization. According to various aspects, the identifier may indicate that the payment account has been used in a previous transaction between the cardholder and the merchant. The identifier may also indicate to computing devices on the payment network, such as an issuing bank, that the merchant has a relationship with the cardholder, and that the cardholder information was previously stored by the merchant.

When card information is stored by a merchant, the card information may include the PAN and the expiration date of the card, but not the CVM. As a result, there is a greater risk involved when a consumer makes a "card on file" purchase because the merchant does not have the CVM and the transaction is not a recurring payment. According to various exemplary embodiments, the newly described unique identifier verifies that the merchant has a pre-existing relationship with the cardholder. For example, the identifier may identify the transaction as a card on file transaction and not a recurring payment transaction. The identifier may be stored in an already existing data field of the ISO 8353 message, for example, in one or more data element fields of the ISO 8583 message.

Figure 1:
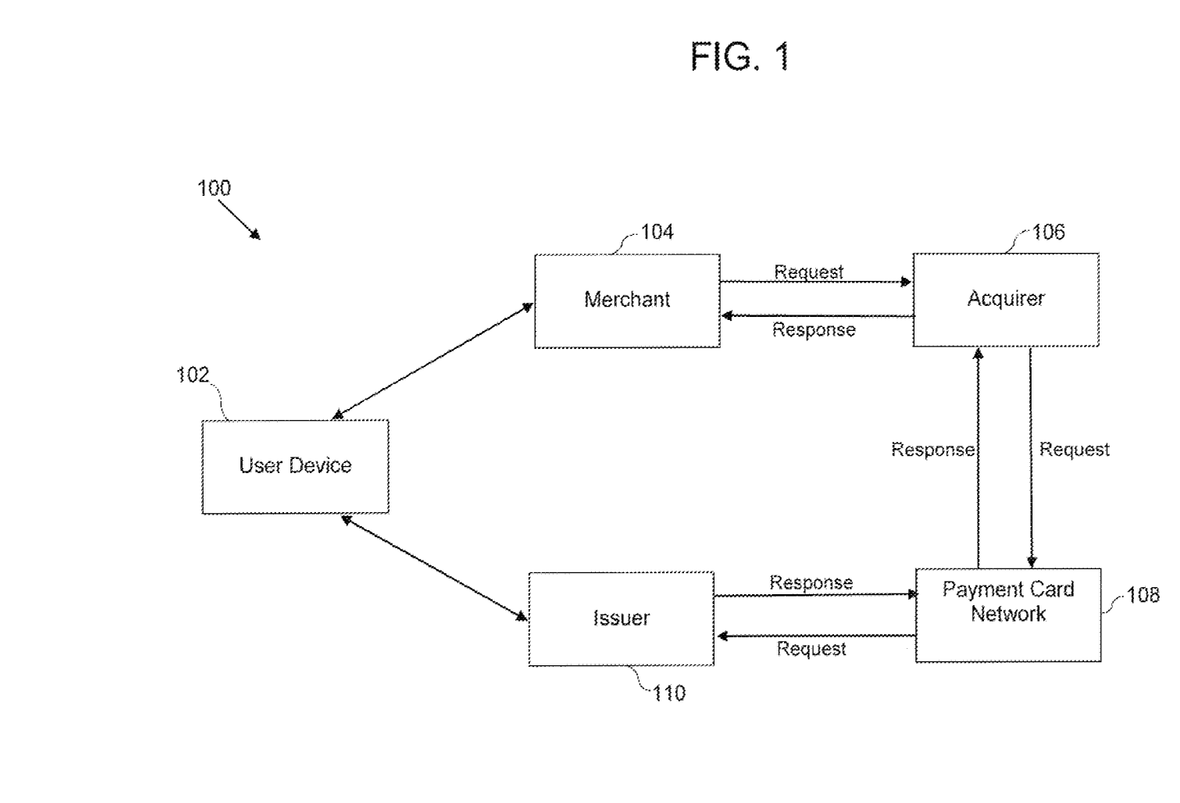
FIG. 1 is a diagram illustrating a payment system in accordance with an exemplary embodiment.

FIG. 1 is a diagram illustrating a payment system 100 in accordance with an exemplary embodiment. According to various aspects, a card on file identifier may be inserted into a transaction message such as a transaction authorization request message. The transaction authorization request may be transmitted through the payment system 100 to authorize a transaction between a user and a merchant.

Referring to FIG. 1, the payment system 100 includes a user computing device 102, a merchant computing device 104, an acquirer 106, a payment card network 108, and an issuing bank (issuer) 110. The user computing device 102 may include a web browser that enables a customer (i.e., a cardholder) the ability to access a merchant site provided by merchant computing device 104 through the World Wide Web. For example, the customer may access a checkout page, a payment submission page, and the like, through the merchant site, and request payment of an item. In response, the merchant may ask the customer for a payment account to be used as payment. According to various aspects, the customer may select a card on file, or a previously stored payment account, as the account to be used to pay for the transaction. For example, the card on file may be stored during a previous purchase, or previously added and stored by the customer. As another example, although not shown in FIG. 1, the customer may visit the merchant store in-person and collect items for purchase. While at the merchant location, the customer may request to pay for the items using a payment account saved on file at the merchant store.

In response to receiving a request from the customer of the user computing device 102 to pay for a transaction using a card on file, the merchant computing device 104 may send an authorization request to an acquirer financial institution (acquirer) 106, with which the merchant maintains a relationship. The authorization request may include a payment card account number (PAN), an amount of the transaction, and other information. However, typically, for a card on file transaction, the authorization request does not include a CVM code that corresponds to the card. According to various exemplary embodiments, the merchant computing device 104 or a device connected thereto may add an identifier to the authorization request which identifies or otherwise indicates that the transaction is a card on file transaction. For example, the identifier may be added to the authorization request by a point of sale (POS) terminal of the merchant, a non-merchant payment processing device, and/or the like.

The acquirer 106 routes the authorization request to the issuer 110 through the payment card network 108. The issuer 110 refers to the financial institution that issued the account to the user. The arrows in FIG. 1 illustrate an example of an authorization request message path from the merchant computing device 104 to the issuer 110. In this example, the authorization request and the authorization response travel through the acquirer 106 and the payment card network 108. For example, the payment card network 108 may include a directory server, a payment gateway, an interchange, a bank, and/or the like.

When the authorization request message is received, the issuer 110 determines whether to authorize the transaction. Assuming that all is in order, the issuer 110 may transmit an authorization response indicating successful authorization to the merchant computing device 104. For example, the path of the authorization response from the issuer 110 to the merchant computing device 104 may be an inverse path of the path of the authorization request from the merchant computing device 104 to the issuer 110. Accordingly, the customer may receive an indication that the transaction is successful or has been declined. A subsequent clearing transaction initiated by the merchant results in a transfer of the transaction amount from the customer's payment card account at the issuer 110 to an account that belongs to the merchant at the acquirer 106. The customer's payment card account may be, for example, a debit card account, a credit card account, and the like.

The example system 100 in FIG. 1 may be somewhat simplified in some respects. For example, a merchant processing system (not shown) may be interposed between the merchant computing device 104 and the acquirer 106. It should also be appreciated that a merchant processing system may be operated by or on behalf of the merchant to form a portion of the communications path between the acquirer 110 and a plurality of merchant devices operated by the merchant. Also, system 100 may include a third party transaction processing service, such as a payment services provider (PSP), which may handle payment card transactions on behalf of the acquirer 106 and on behalf of a large number of other similar financial institutions.

In the example of FIG. 1, the user computing device 102 and the merchant computing device 104 may communicate via a public network such as the Internet. Similarly, the merchant computing device 104, the acquirer 106, the payment card network 108, and the issuer 110 may communicate with each other through the Internet. The connections between devices in the system 100 may be wired, wireless, or a combination thereof. The user computing device 102 may be any device capable of communicating with the merchant computing device 104, for example, a mobile phone, a smart phone, a computer, a tablet, a phablet, a kiosk, an appliance, and the like.

Furthermore, it should also be appreciated that the issuer 110 may be, or may be connected to, an access control server of an issuing bank that performs an authentication of the customer based on the payment account information. For example, the authentication may be a Three Domain Secure (3D Secure) authentication, and the like. Accordingly, the user computing device 102 may also transmit an accountholder authentication value (AAV) to the merchant computing device 104 which is used to verify that the accountholder is the person requesting the transaction. For example, the merchant computing device 104 may receive the AAV and include the AAV in the authorization request message that is transmitted from the merchant computing device 104 to the issuer 110.

Figure 2:
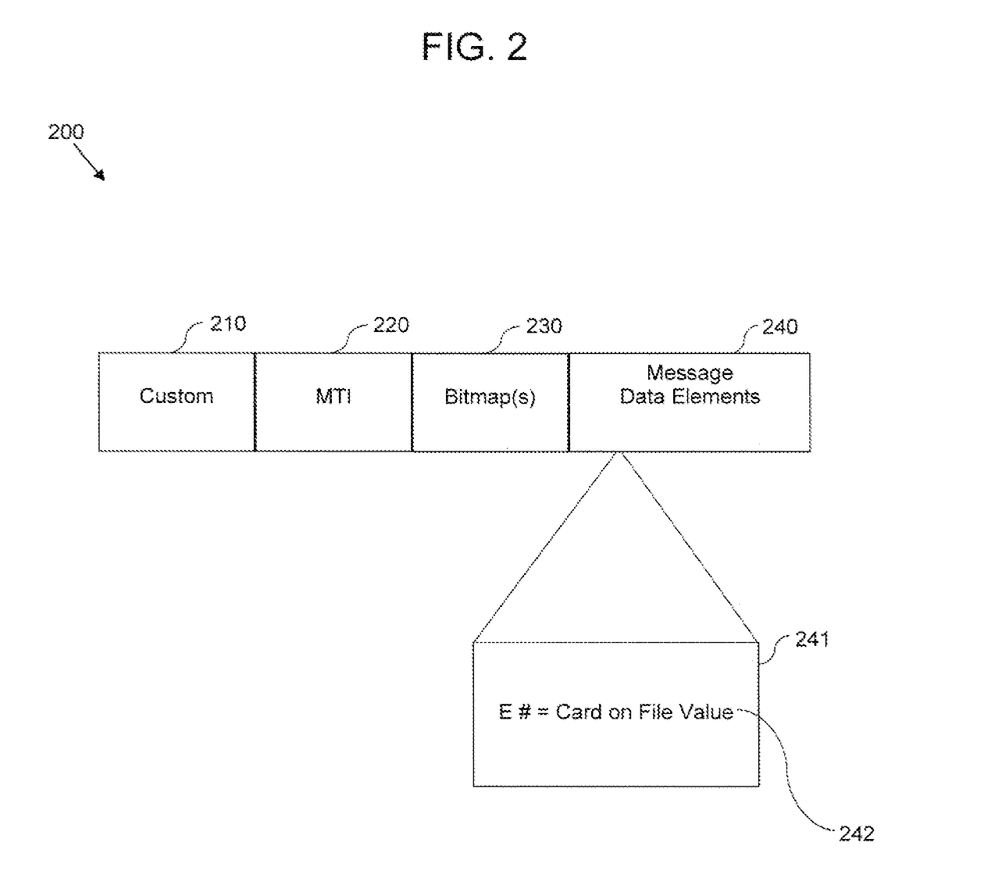
FIG. 2 is a diagram illustrating a transaction message that may be transmitted and received within the payment system of FIG. 1 in accordance with an exemplary embodiment.

FIG. 2 is a diagram illustrating a transaction message that may be transmitted within the payment system 100 of FIG. 1 in accordance with an exemplary embodiment. For example, the transaction message may be an ISO8583 transaction authorization request/response message. It should also be appreciated that the transaction message may be any type of authorization message transmitted between a merchant and a payment network.

Referring to FIG. 2, transaction message 200 includes a message type indicator (MTI) 220, one or more bitmaps 230, and a plurality of message data elements 240. In some examples, the transaction message 200 may also include a header field 210 which may be customized, for example, based on the use and/or users of the transaction message. The MTI 220 may include information about a message type of the message, for example, the version of the message, the message function, the sender, and the like. For example, the MTI 220 may specify that the message 200 is an authorization message, a financial message, a reversal or chargeback message, a network management message, and the like. The MTI may include a plurality of digits, for example, four digits.

The one or more bitmaps 230 may be used to indicate which elements are present in the body of the message (e.g., which elements are present in the data elements 240). For example, the message 200 may include a primary bitmap specifying which data elements 240 are present in a first group of data elements 240, and a secondary bitmap specifying which data elements 240 are present in a second group of data elements 240. In some examples, each bitmap may represent 64 data element fields, or the like.

The data element fields 240 may include information about the transaction, for example, transaction type, amount, dates, times, customer ID, country codes, and the like. Some or all of the data element fields 240 may be further divided into subfields. Also, each data element 240 may have their own format, attribute, and length. Furthermore, each data element number may have a standard purpose, for example, data element four (#4) may represent a transaction amount, data element twenty-two (#22) may represent a point-of-service entry mode, and the like.

According to various exemplary embodiments, an identifier may be included in the message 200 and may identify the transaction as a card on file transaction or an account on file transaction. For example, the identifier may uniquely identify the transaction as a transaction that is entered as a card on file, without providing an additional indication of any other type of transaction such as a recurring payment transaction. In the example of FIG. 2, an identifier 242 (also referred to as card on file identifier) is included within a data element 241 of the plurality of data elements 240 of the transaction message 200. For example, the identifier 242 may include a value such as an alphanumeric value (i.e., binary, numeric, etc.), a special character, a blank, and/or the like. The identifier 242 may be appended to a value included within the data element 241, it may be a stand-alone value (i.e., a new value) for data element 241, and the like. In some examples, the identifier 242 may be added to a subfield of the data element. The identifier 242 may be added or inserted into the authorization request message by a merchant computing device such as a point-of-sale or point-of-service device. As another example, the identifier 242 may be added or inserted into the authorization request message by a non-merchant payment processor.

As a non-limiting example, the identifier 242 may be a new value included within or added to data element 22 of an ISO 8583 message. The identifier 242 may be included in an existing PAN entry mode data element field and value. According to various aspects, the identifier 242 may be used in a case in which the primary account number is not tokenized by a digital enablement service. Also, the message 200 may include the identifier 242 in a case in which the CVV value of the cardholder is not included in the message 200. Accordingly, the identifier 242 may further provide evidence of a valid transaction because the identifier 242 may indicate a previous relationship has been established between the merchant and the consumer.

Regardless of the values used, the identifier 242 may differentiate between a card on file with a merchant and a card on file with a non-merchant. For example, the identifier 242 may have a first value for a card on file with a merchant and may have a second, different value for a card on file with a non-merchant payment entity. An example of a non-merchant payment entity includes a digital wallet. The card on file with a merchant identifier may indicate that the card information (or payment account information) is stored electronically with the merchant and the card on file with a non-merchant identifier may indicate that the card information is stored electronically in a payment method that is not controlled by the merchant.

It should also be appreciated that the card on file identifier 242 may be included within other fields of the transaction message 200. For example, the identifier 242 may be included within the custom header 210, the MTI 220, the one or more bitmaps 230, and/or the like. Also, the one or more bitmaps 230 may store an indicator indicating that the card on file identifier 242 is present within a data element 241 of the plurality of message data elements 240 of the current transaction message 200.

Figure 3:
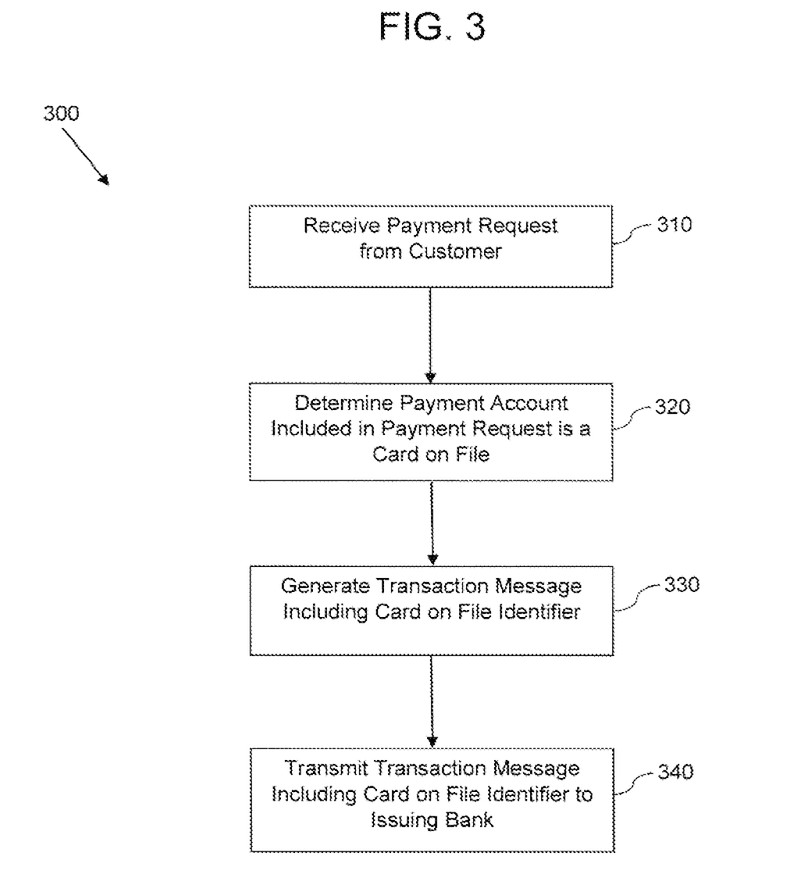
FIG. 3 is a diagram illustrating a method of generating an authorization request for a card on file transaction in accordance with an exemplary embodiment.

FIG. 3 is a diagram illustrating a method 300 of generating an authorization request for a card on file transaction in accordance with an exemplary embodiment. For example, method 300 may be performed by a merchant computing device, a point of sale (POS) terminal of the merchant, a non-merchant payment entity, and the like.

Referring to FIG. 3, the method includes receiving a request for payment of a transaction from a customer, in 310. For example, the request for payment may be received by a terminal such as a merchant computing device or a non-merchant payment device electrically connected thereto. The payment request may be received through a web site provided by the merchant. For example, the payment request may be received when a user accesses a checkout page on a merchant's website and submits payment information. The payment request may include information about a payment account, for example, a PAN, an expiration number, a name of the accountholder, an amount, a date, a time, a merchant ID, and the like.

In 320, the payment account information included in the payment request is determined to be a payment account that is already on file. For example, the payment account may already be on file with the merchant, the non-merchant payment processing device, and the like. In response to determining that the payment account is already on file in 320, a transaction message including a card on file identifier is generated in 330. For example, the transaction message may be an authorization request message such as an ISO 8583 authorization request message created by a terminal such as a POS terminal of a merchant or non-merchant. In this example, the identifier may be included within an already existing data field and value of an authorization request message such as an ISO 8583 authorization request message.

In 340, the generated transaction message including the card on file identifier may be transmitted to an issuing bank. For example, the transaction message may be transmitted from the merchant computing device 104 to the issuer 110, through the acquirer 106 and the payment card network 108, as shown in the example of FIG. 1. As is further described herein with reference to the authorization method of FIG. 5, the issuer may determine whether to authorize the payment request, and may transmit a notification of the authorization to the merchant computing device 104.

Figure 4:
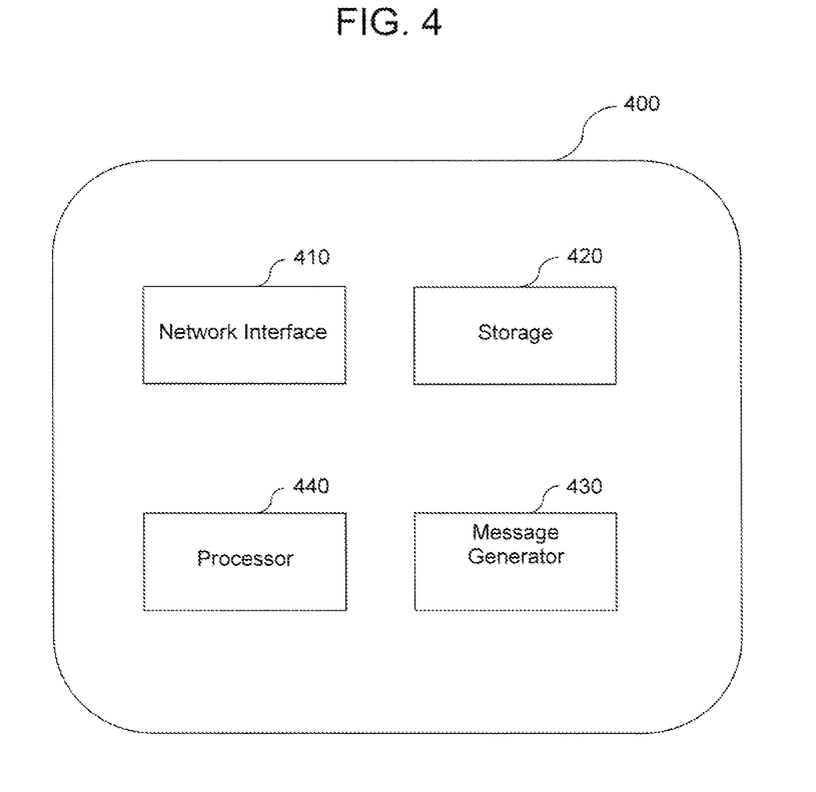
FIG. 4 is a diagram illustrating an example of a point of sale computing device in accordance with an exemplary embodiment.

FIG. 4 is a diagram illustrating an example of a point of sale computing device 400 in accordance with an exemplary embodiment. For example, the POS computing device 400 may be the merchant computing device 104 shown in FIG. 1, or a computing device electronically connected to the merchant computing device 104. As another example, the POS computing device 400 may be a non-merchant computing device that takes the place of the merchant computing device. The POS computing device 400 may perform the method 300 described with respect to the example shown in FIG. 3.

Referring to FIG. 4, the POS computing device 400 includes a network interface 410, a storage 420, a message generator 430, and a processor 440. It should be appreciated that the POS computing device 400 may include additional elements not shown herein, and is not limited to the example of FIG. 4. The network interface 410 may connect the POS computing device 400 to other devices on a network such as the Internet. For example, the network interface 410 may enable the POS computing device 400 to transmit and receive transaction messages and requests through the payment system 100 shown in FIG. 1. Here, the network interface 410 may enable wired and/or wireless communication between other devices connected on the network.

The storage 420 may store customer payment account information, among other things. The stored payment account information may be referred to as account on file or card on file information. As an example, a customer may access a merchant web site that is operated by a merchant computing device. The merchant computing device may be or may be connected to the POS computing device 400. During an initial access, the customer may enter payment account information during a checkout process, or enter payment account information to be saved. In response, the storage 420 may store the payment account information which may be used by the customer during subsequent purchases.

Message generator 430 may generate a transaction message, for example, a transaction authorization request message such as the authorization request message according to the ISO 8583 standard. The message generator 430 may generate a transaction message including a card on file identifier. For example, the identifier may be included within an already existing data field and value of the ISO 8583 authorization request message. The message generator 430 may generate the transaction message in response to the processor 440 determining that a payment request received from a customer corresponds to a payment account already stored on file in storage 420. Also, the processor 440 may control the overall operations of the POS computing device 400.

Figure 5:
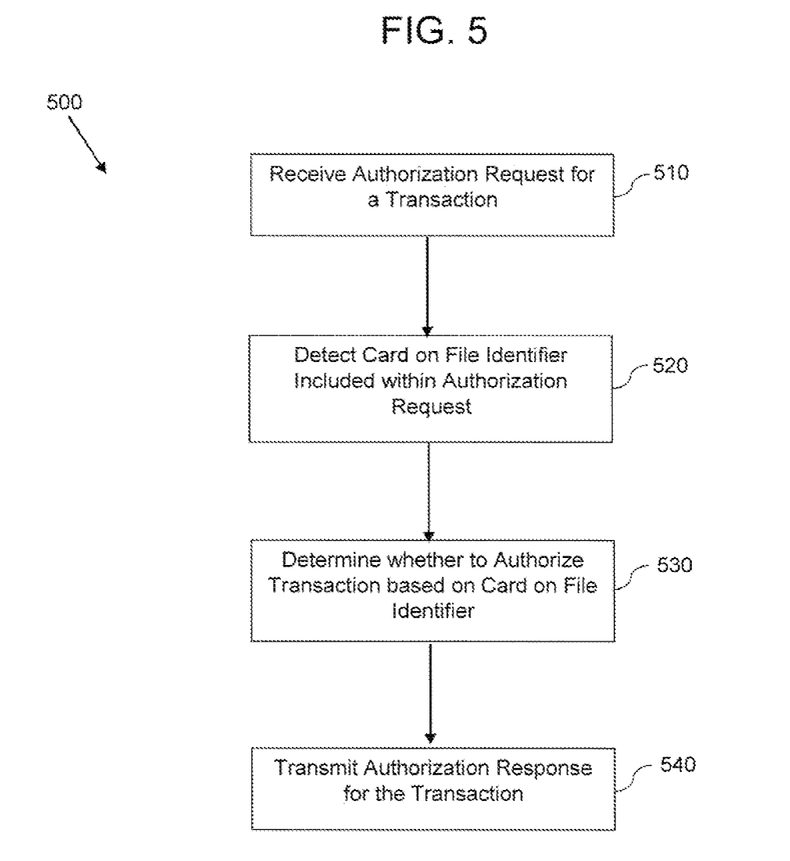
FIG. 5 is a diagram illustrating a method of processing an authorization request for a card on file transaction in accordance with an exemplary embodiment.

FIG. 5 is a diagram illustrating a method 500 of processing an authorization request for a card on file transaction in accordance with an exemplary embodiment. For example, the method 500 may be performed by an issuing bank (such as the issuer 110 in FIG. 1), a payment processing device, a payment card network server, and the like.

Referring to FIG. 5, a request to authorize a payment transaction is received in 510. For example, the authorization request may include an authorization request message according to the ISO 8583 protocol. The authorization request may be received from, for example, a merchant computing device, an acquiring bank, a payment card network, a third party non-merchant payment processor, a combination thereof, and the like. The transaction message may be transmitted and received over the Internet.

In 520, a card on file identifier is detected within the authorization request. For example, the card on file identifier may be detected from within an already existing data field of the authorization request such as an existing data element of the ISO 8583 authorization request message. Also, the presence of the card on file identifier may be detected based on a bitmap value included in the ISO 8583 authorization request message which indicates the presence of the card on file identifier in a data element field or subfield.

In response to receiving the authorization request, in 530 a determination is made as to whether to authorize the transaction based on information included in the authorization request including the card on file identifier. The inclusion of the card on file identifier in the authorization request message may help improve the validity of transactions and reduce the amount of fraud that occurs. Accordingly, when an issuing bank detects the inclusion of the card on file identifier in the authorization request, an issuing bank may be more inclined to authorize the transaction in comparison to an authorization request that does not include the card on file identifier.

In response to determining whether to authorize the transaction, in 540 an authorization message response is generated and transmitted to the merchant or non-merchant payment device. For example, the authorization message response may be an ISO 8583 authorization message response, and the like.

Figure 6:
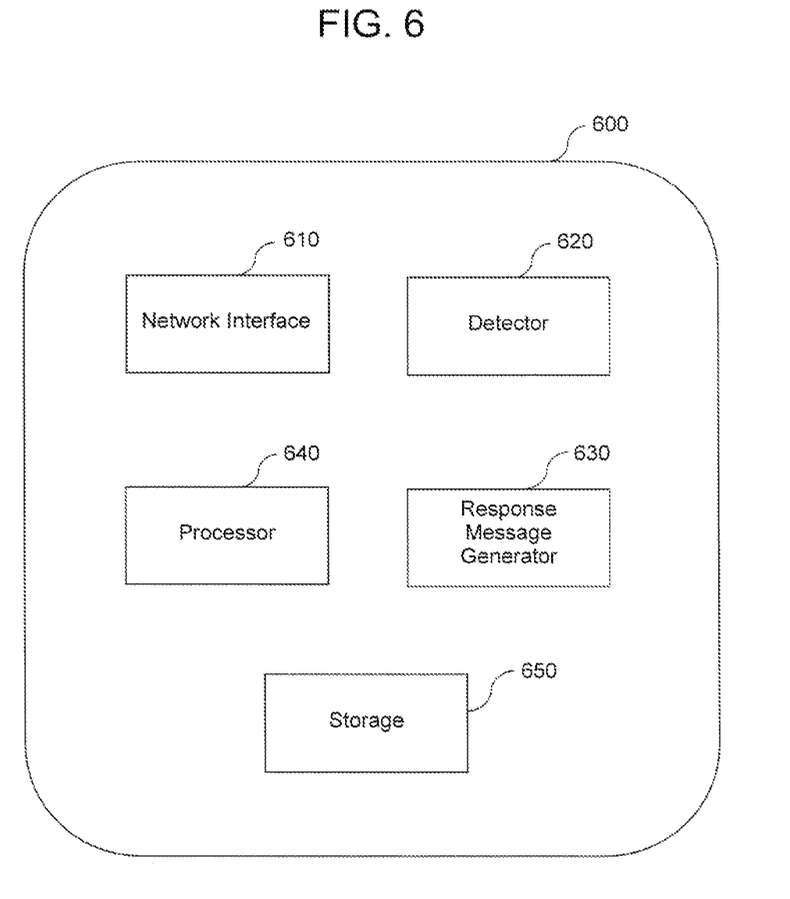
FIG. 6 is a diagram illustrating an example of a payment processing computing device in accordance with an exemplary embodiment.

FIG. 6 is a diagram illustrating an example of a payment processing computing device 600 in accordance with an exemplary embodiment. For example, the payment processing computing device 600 may be, or may be connected to, an issuing bank computing device, a non-merchant payment processor, and the like.

Referring to FIG. 6, the payment processing computing device 600 includes a network interface 610, a detector 620, a response message generator 630, a processor 640, and a storage 650. It should be appreciated that the payment processing computing device 600 may include additional elements not shown herein, and is not limited to the example of FIG. 6. The network interface 610 may connect the payment authorization computing device 600 to other devices on a network such as the Internet. For example, the network interface 610 may enable the payment processing computing device 600 to transmit and receive transaction messages and requests through the payment system 100 shown in FIG. 1.

The detector 620 may detect a card on file identifier included within the authorization request. For example, the card on file identifier may be detected from within an already existing data field of the authorization request such as the ISO 8583 authorization request message. In this case, the card on file identifier may be an existing value in an existing field. As a non-limiting example, the detector 620 may detect the card on file identifier is included within the message based on a bitmap value included in the ISO 8583 authorization request message indicating the presence of the card on file identifier within a data element field or subfield of the message.

The response message generator 630 may generate an authentication response message in response to the authentication request message. For example, the authentication response message may be an ISO 8583 authorization response message. The processor 640 may determine whether to authorize the transaction based on cardholder information stored in the storage 650 and based on the card on file identifier detected from the authorization request message. In response to authorizing the transaction, the processor 640 may add a successful authorization notification to the authorization response message. Also, the processor 640 may control the overall operations of the payment processing computing device 600.

The present application makes it possible to identify card-on-file transactions when an EMV token is not used. Moreover, when identifying transactions as a recurring payment when it is simply a card-on-file transaction does not provide the needed granularity about the transaction attributes, which can make identifying the fraud and the overall risk of the transaction difficult for card issuers, as well as for payment networks. The card-on-file indicator according to various exemplary embodiments may create greater transparency for transactions that don't leverage EMV tokens and may provide a greater confidence to the issuer that the merchant has an existing relationship with the cardholder. In addition, the card-on-file indicator may allow issuers and payment networks to expand their fraud monitoring flags.

Currently, card on file transactions have a higher decline rate because there is no CVM stored with the card information. The card-on-file indicator described according to various aspects should increase approval rates. Issuers and payment networks now have insight into the existing relationship with the cardholder and merchant.

According to various exemplary embodiments, described herein is a system and method for identifying a transaction as a card on file transaction. An identifier may be included in an authorization request message transmitted from a merchant to a payment authorizing authority such as an issuing bank. The identifier can leverage an already existing field and already existing value in that field of an authorization request message, creating minimal impact on current transaction processing. Furthermore, the identifier may be used solely to identify the transaction as a card on file transaction and not to identify additional features such as recurring payment transaction. Accordingly, fraud scoring and fraud prevention may be improved.

As used herein, the terms card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like. As another example, the terms may refer to any other device or media that may hold payment account information, such as mobile phones, Smartphones, personal digital assistants (PDAs), key fobs, computers, and the like. The transaction card can be used as a method of payment for performing a transaction.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A computing system for processing a transaction using account information on file comprising:
a network interface of a payment processing computer system configured to receive, from a merchant computing device of a merchant, a payment authorization request message comprising content embedded therein for processing a payment transaction based on a primary account number (PAN) of a cardholder; and
a processor of the payment processing computer system configured to:
identify, based on a bitmap stored within the payment authorization request message, that a unique identifier is present in an existing data field within the embedded content of the payment authorization request message, wherein the unique identifier comprises a first value if the payment account information is saved on file with the merchant and a different second value if the payment account information is saved on file with a non-merchant payment entity, and wherein the unique identifier verifies that the merchant has a pre-existing relationship with the cardholder;
determine, based on the unique identifier, that the PAN was successfully used at the merchant previously; and
execute the payment transaction in response to the determination that the PAN was successfully used previously at the merchant.

2. The computing system of claim 1, wherein the unique identifier is embedded within an existing field of a payment authorization request message that complies with International Organization for Standardization (ISO) 8583.

3. The computing system of claim 1, wherein the processor is configured to determine that the payment transaction is a recurring payment transaction based on a recurring payment identifier stored in the payment authorization request message which is separate from the unique identifier.

4. The computing system of claim 1, wherein the processor is further configured to control the network interface to transmit the payment authorization request message with the unique identifier stored within the embedded content to an issuer of the PAN of the cardholder.

5. The computing system of claim 1, wherein the unique identifier comprises an alphanumeric value that is appended to a value already stored within a field of the payment authorization request message.

6. The computing system of claim 1, wherein the unique identifier comprises an alphanumeric value that is stored as a stand-alone value within a field of the payment authorization request message.

7. A method for processing a transaction using account information on file comprising:
receiving, by a payment processing computer system from a merchant computing device of a merchant, a payment authorization request message comprising content embedded therein for processing a payment transaction based on a primary account number (PAN) of a cardholder;
identifying, by the payment processing computer system based on a bitmap stored within the payment authorization request message, that a unique identifier is present in an existing data field within the embedded content of the payment authorization request message, wherein the unique identifier comprises a first value if the payment account information is saved on file with the merchant and a different second value if the payment account information is saved on file with a non-merchant payment entity, and wherein the unique identifier verifies that the merchant has a pre-existing relationship with the cardholder;
determining, by the payment processing computer system, that the PAN was successfully used at the merchant previously; and
executing, by the payment processing computer system, the payment transaction in response to the determination that the PAN was successfully used previously at the merchant.

8. The method of claim 7, wherein the unique identifier is embedded within an existing field of a payment authorization request message that complies with International Organization for Standardization (ISO) 8583.

9. The method of claim 7, wherein the determining further comprises determining that the payment transaction is a recurring payment transaction based on a recurring payment identifier stored in the payment authorization request message which is separate from the unique identifier.

10. The method of claim 7, wherein the method further comprises transmitting the payment authorization request message with the unique identifier stored within the embedded content to an issuer of the PAN of the cardholder.

11. The method of claim 7, wherein the unique identifier comprises an alphanumeric value that is appended to a value already stored within a field of the payment authorization request message.

12. The method of claim 7, wherein the unique identifier comprises an alphanumeric value that is stored as a stand-alone value within a field of the payment authorization request message.

13. A non-transitory computer-readable medium comprising instructions which when executed by a processor cause a computer to perform a method for processing a transaction using account information on file comprising:
receiving, from a merchant computing device of a merchant, a payment authorization request message comprising content embedded therein for processing a payment transaction based on a primary account number (PAN) of a cardholder;
identifying, based on a bitmap stored within the payment authorization request message, that a unique identifier is present in an existing data field within the embedded content of the payment authorization request message, wherein the unique identifier comprises a first value if the payment account information is saved on file with the merchant and a different second value if the payment account information is saved on file with a non-merchant payment entity, and wherein the unique identifier verifies that the merchant has a pre-existing relationship with the cardholder;

determining that the PAN was successfully used at the merchant previously; and executing the payment transaction in response to the determination that the PAN was successfully used previously at the merchant.

14. The non-transitory computer-readable medium of claim 13, wherein the unique identifier is embedded within an existing field of a payment authorization request message that complies with International Organization for Standardization (ISO) 8583.

15. The non-transitory computer-readable medium of claim 13, wherein the determining further comprises determining that the payment transaction is a recurring payment transaction based on a recurring payment identifier stored in the payment authorization request message which is separate from the unique identifier.

16. The non-transitory computer-readable medium of claim 13, wherein the method further comprises transmitting the payment authorization request message with the unique identifier stored within the embedded content to an issuer of the PAN of the cardholder.

17. The non-transitory computer-readable medium of claim 13, wherein the unique identifier comprises an alphanumeric value that is appended to a value already stored within a field of the payment authorization request message.

* * * * *